April 15, 1952  A. F. LUKES  2,592,815
CEMENT GUN
Filed March 20, 1946  2 SHEETS—SHEET 1
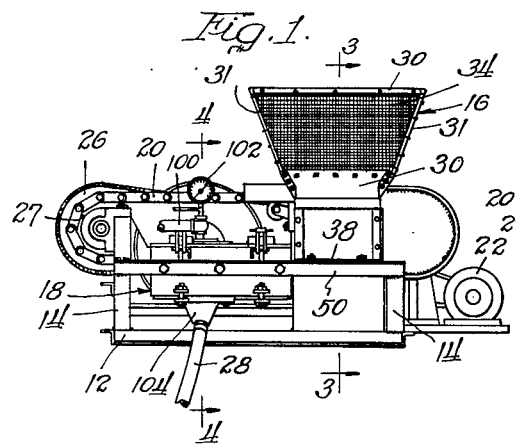
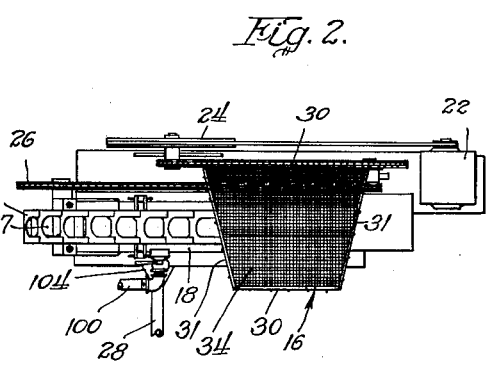
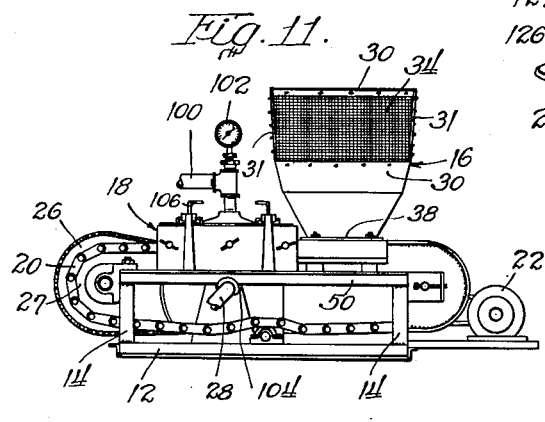
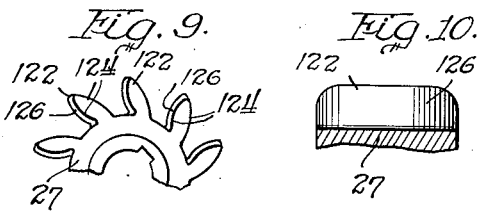
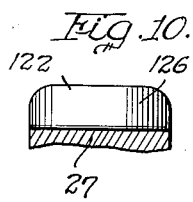
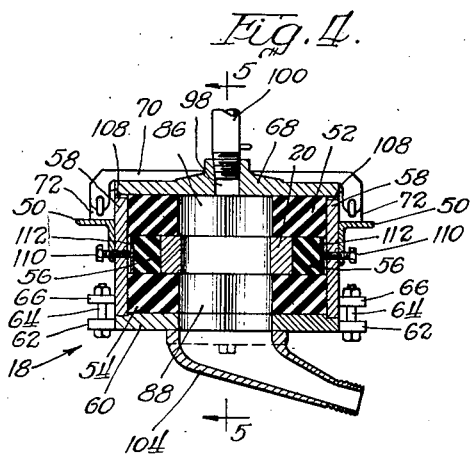
Inventor:
Adolph F. Lukes.
By Baird Freeman
Attorneys.

April 15, 1952     A. F. LUKES     2,592,815
CEMENT GUN
Filed March 20, 1946     2 SHEETS—SHEET 2
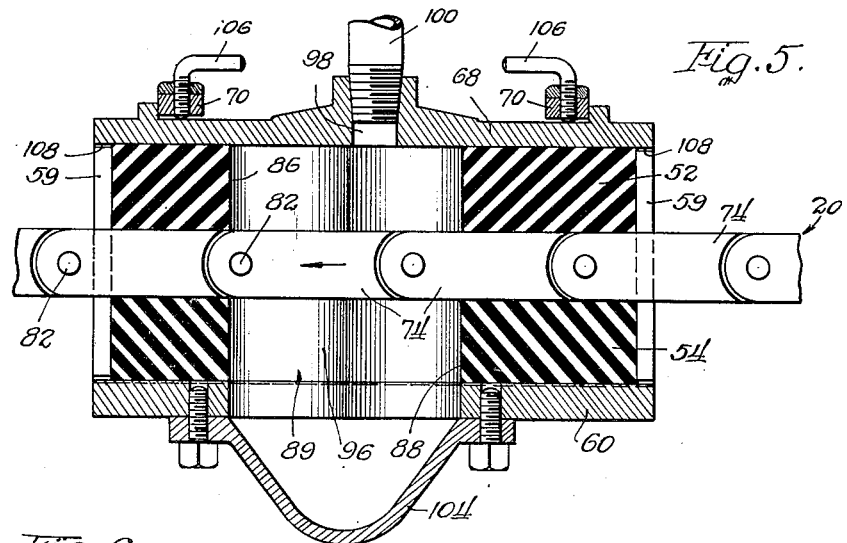
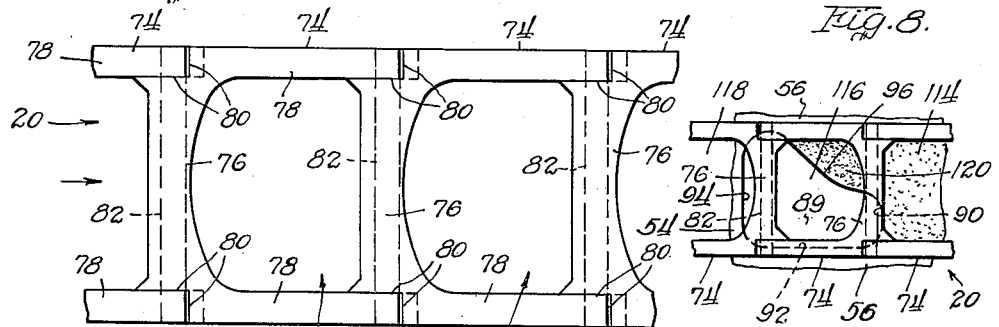
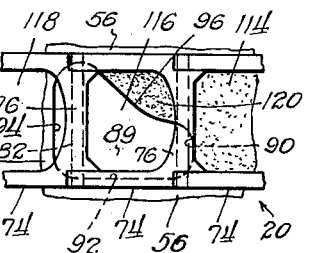
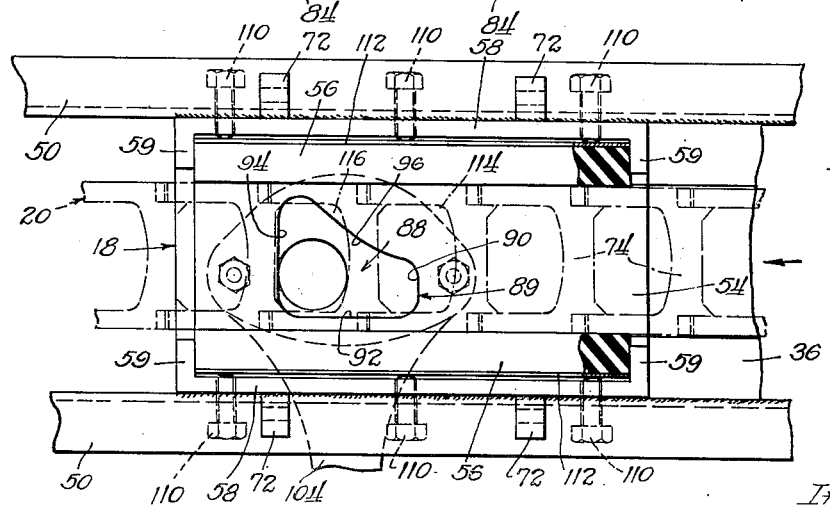
Inventor:
Adolph F. Lukes.
By Baird Freeman
Attorneys.

Patented Apr. 15, 1952

2,592,815

UNITED STATES PATENT OFFICE 2,592,815

CEMENT GUN

Adolph F. Lukes, Waterloo, Iowa

Application March 20, 1946, Serial No. 655,862

4 Claims. (Cl. 302—49)

This invention relates to cement guns, and particularly a device for uniformly feeding a mixture of cement and sand to a cement gun at the point of application. The device is also applicable for use in sand-blasting, and for blowing sand in foundry molds.

In previous devices in this field, there has been difficulty in obtaining steady and uniform flow of cement and sand mixture. This difficulty is mainly due to the fact that the material is dry and is difficult to motivate by air pressure, that is, it will not "flow." However, if the quantities of dry materials are small, there is more likelihood of its "flowing" or passing along gradually and uniformly upon the application of air pressure.

The present invention overcomes the difficulty above mentioned to a great degree. The device is designed so that a small quantity of the dry material is brought into the air stream at a time and the whole charge is not thrown into the air stream simultaneously, but is brought into it gradually, so that that small quantity of the material is driven along, a little at a time. Before each small charge of material is completely emptied into the air stream, the succeeding charge begins to empty into the air stream. The procedure continues in such a manner that a whole charge is never placed in the air stream at one time, nor is there ever a time when there is no material being placed in the air stream.

More specifically, the mechanism includes a chain-like device made up of articulated links forming receptacles for cement and sand and having solid perimeter walls of appreciable depth. The links or receptacles pass through a hopper of material for filling and then travel between resilient plates having registering openings forming a discharging chamber, and between which the chain travels for discharging the material. The shape of these openings is an essential feature of the invention. They are roughly triangular in shape and have a small end disposed in a direction opposite to the direction of travel of the chain. The links carrying the material therefore pass into the discharging chamber in such a manner that only a small portion of the material is exposed to air pressure at first, and then a progressively greater amount. The dimension of the discharging chamber in the direction of travel of the chain is greater than the linear dimension of each link. Therefore, due to the length and peculiar shape of the discharging chamber, before each link has passed to the point where its whole surface is exposed in the chamber, the next succeeding link has entered the chamber at the small end thereof. By this time the first link is discharging material at a decreasing rate and the succeeding link begins to discharge material at an increasing rate, resulting in a substantially uniform flow of material.

With these and other objects in view, my invention consists in the construction, arrangement and combination of the various parts of my device whereby the objects contemplated are attained, as hereinafter more fully set forth, pointed out in my claims and illustrated in the accompanying drawings, wherein:

Fig. 1 is a side elevational view of the device of my invention;

Fig. 2 is a plan view of the machine;

Fig. 3 is a vertical sectional view taken on line 3—3 of Figure 1, on an enlarged scale;

Fig. 4 is an enlarged vertical sectional view taken on line 4—4 of Figure 1;

Fig. 5 is a vertical sectional view taken on line 5—5 of Figure 4, and on a scale enlarged from that figure;

Fig. 6 is a plan view of a segment of the conveyor for the machine, showing several individual links, or receptacles;

Fig. 7 is a plan view of the interior of the discharging device with the top plate removed, and a segment of the conveyor shown in dot and dash lines.

Fig. 8 is a diagrammatic showing of the relation of successive links or receptacles when passing through the discharging device;

Fig. 9 is a detail view of a sprocket for driving the conveyor;

Fig. 10 is a cross sectional view of a tooth of the sprocket of Fig. 9; and

Fig. 11 is a side elevational view, similar to Fig. 1, of a modified form of my invention.

Referring in detail to the drawings, the machine as a whole includes a base 12 with upright members 14 built thereon for supporting the operating parts of the machine, which include a hopper or container 16 for the cement and sand material, a discharging device shown generally at 18 and a conveyor 20. In the operation of the device, a mixture of cement and sand in proper proportions is placed in the hopper 16. However, when reference is made to "cement," either in the specification or claims, it will be understood to include cement, a mixture of cement and sand, sand alone, or any other dry material. Any well-known means can be utilized for operating the conveyor, such as an electric motor 22 arranged to drive pulley 24 which in turn, through a suitable drive train, operates sprocket 26 mounted on a common shaft with sprocket 27 which engages the conveyor.

In the operation of the device, the conveyor 20 picks up cement from the hopper 16 and carries it to the discharging device 18, where it is discharged through conduit 28 to the point of application.

The hopper 16 utilized in the preferred embodiment is shown clearly in Fig. 3, and consists of a downwardly converging bin having side walls 30 and end walls 31. The hopper 16 has an upper opening 32 which is disposed at an angle sloping to one side for ease in filling the hopper and is provided with a screen 34. The walls 30 rest on a horizontal plate 36 mounted on the upright members 14 by means of bolts passing through the outturned flanges 38 formed in the side walls 30 and bearing plate 36. Openings 40 are formed in the end walls 31 at the lower extremity thereof for the passage of the conveyor 20 therethrough. The openings 40 are formed low and wide to accommodate the shape of the conveyor 20 without unnecessary space surrounding the conveyor. The shape and structure of the conveyor will be described in detail later. Additional openings 42 are also formed in the end walls 31 at points upwardly from the openings 40 for the passage of the return run of the conveyor 20. A structure 44 forms a channel through the central part of the hopper 16 and consists of a bottom section 46, rectangular in shape and conforming to the shape of conveyor 20, upon which the upper run of the conveyor bears, and a covering plate 48 of inverted V-shaped formation. The structure 44 is secured to the end walls 31, surrounding the openings 42, forming an enclosed channel for the passage of the conveyor without the loss of cement material from the hopper 16. The upper surface of the covering plate 48 being inclined enables all the material in the hopper 16 to pass by the channel 44 and not be retarded thereby.

The conveyor 20 is constructed to form receptacles which will be described in detail later. The lower run of the conveyor 20 passes into the interior of the hopper 16, the lower extremity of the hopper being open to the conveyor, whereby the cement in the hopper falls into the receptacles of the conveyor and is carried out thereby.

Referring again to Fig. 1, after the receptacles of the conveyor are filled with cement, they pass into the discharging device 18. Accordingly the lower run of the conveyor 20 passes from right to left as shown in Fig. 1, the conveyor sprocket 27 and a similar conveyor sprocket on the opposite end of the machine rotating in a clockwise direction.

The discharging device 18 is supported by two angle irons 50 running longitudinally on opposite sides of the machine and supported by the upright members 14. The discharging device, as shown in Figs. 4 and 5, includes an upper plate 52, a lower plate 54, and two side strips 56, all running longitudinally of the conveyor 20. The upper plate 52 and the lower plate 54 are flat, horizontally disposed plates, and strips 56 are filler strips to enclose the lateral areas between the plates 52 and 54. The plates 52 and 54, and side strips 56, are of rubber or other resilient material for engaging and sealing the conveyor 20 as it passes through the discharging device 18. The plates 52 and 54 are held as a unit by vertical side retaining plates 58 having inturned ends 59, welded or otherwise secured to the angle strips 50; and a base supporting plate 60 having lateral lugs 62 through which bolts 64 pass and are secured to corresponding lateral lugs 66 formed on the side plates 58. Enclosing the unit is a cover plate 68 which is clamped in place on the unit by yokes 70 which are secured to lugs 72 formed on the angle irons 50.

Referring now to the operation of the discharging device 18 and the cooperation between the discharging device and the conveyor, the conveyor as a whole, as well as the individual links forming the conveyor, is of regular outline, that is, in cross section it defines an outer contour having flat surfaces, and in this case being of rectangular formation. The opening formed by the upper plate 52 and the lower plate 54 of the discharging device, and defined laterally by the side strips 56, is also of rectangular formation, since the plates 52 and 54, and side strips 56, have inner flat surfaces. The conveyor 20 is arranged for passing through this longitudinal opening.

The conveyor is made up of a series of individual links 74, each of which is generally of U-shape in formation. Each link has a cross piece 76 and side pieces 78. The cross piece 76 is notched as indicated at 80 at both rear corners for fitting the free ends of the side pieces 78 thereto, the notches 80 being of the same depth inwardly from the sides of the links as the thickness of the side pieces 78, whereby all surfaces of the chain as a whole, when the links are fitted together, present smooth, flat surfaces.

Pins 82 are fitted through openings in the free ends of the side pieces 78 and cross piece 76 for pivotally connecting the links together. In Figs. 5 and 6, it will be seen that the various dimensions of the elements forming the links are great, that is, the links are formed heavy and rugged, which must be the case in order to withstand wear. The links 74 may be made of metal or any other material which is rigid and will withstand the wear incident to its operation. Defined in each link 74 is an area 84 into which the material falls. Accordingly these areas or pockets 84 form receptacles which convey a considerable amount of material, due to their depth, which is indicated by the vertical dimension of the receptacle, as shown in Fig. 5. Each pocket 84 is therefore defined by a continuous perimeter formed by the three sides of one link and one of the sides of the adjacent link. The view of Fig. 6 is in plan of the upper run of the conveyor, and as it is employed in the preferred embodiment, travels from left to right, since it is the lower run that carries the material from the hopper 16 to the discharging device 18, the latter, therefore, running from right to left. The links 74 defining receptacles 84 are open on the top and bottom, and in order to retain the cement material therein, the horizontal plate 36 of the hopper extends up to the entrance of the discharging device 18 (see Fig. 7).

The discharging operation is accomplished by conducting a supply of compressed air through the discharge device 18. The upper plate 52 and the lower plate 54 are provided with cavities 86 and 88, respectively, extending entirely through the plates vertically. These cavities are of a peculiar formation and form an important part of this invention. There is such a relation between the size and shape of the cavities and the size and shape of the links 74 of the conveyor that an even and uniform flow of material is insured. The cavities 86 and 88 are symmetrical, that is, when the plates 52 and 54 are placed in position they register vertically as shown in Figs. 4 and 5. The cavity as shown in Fig. 7 is that of the lower plate 54, and when the plate 52 is placed in position thereover, the outline of the two cavities 86 and 88 form a registering vertically extending conduit or discharging chamber indicated generally at 89. The cavities 86 and 88 are roughly of triangular shape and have one reduced end 90 extending in the direction opposite to the direction of travel of the conveyor and, as shown in plan in Fig. 7, to the right. The lower edge 92 of the cavities 86 and 88 extends longitudinally in the direction of the travel of the conveyor 20, and the rear edge 94 extends substantially perpendicular to the line of travel of the conveyor. The edge 96 is diagonally disposed and merges into the edge 94 and the forward end 90 in a curve.

The first edge or edges of the cavities 86 and 88, past which the links 74 of the conveyor move as the conveyor passes through the discharge device 18, is called the leading edge and comprises edges 96 and 90. Each end of each receptacle or pocket 84 has a leading edge which first passes the leading edges of the cavities 86 and 88, and a trailing edge which thereafter passes the leading edges of the cavities 86 and 88.

In Figure 7, where the conveyor is shown passing through the discharge device from right to left, the left hand edge of each passage or receptacle 84 is the leading edge and the right hand edge of each passage 84 is the trailing edge.

It will be seen in Figures 7 and 8 that portions of the leading edges of the cavities 86 and 88 are transverse to the leading and trailing edges of the ends of the passages or receptacles 84 which carry the material. The leading edges of the cavities 86 and 88 are so positioned with respect to the leading and trailing edges of the ends of the material carrying passages 84 that portions of the discharge device adjacent and forward of the leading edges of the cavities cover a portion of the ends of one passage 84 when a portion of the ends of the following passage 84 has just passed the leading edges of the cavities and is beginning to register therewith. In this way a continuous flow of material is maintained at all times.

The conveyor 20 is superimposed on Fig. 7, in dot and dash lines, to show the relation between the receptacles 84 and the cavities 86 and 88. The greatest transverse dimension or width of the discharging chamber 89 is greater than the transverse dimension between the inner edges of the links 74, or the transverse dimension or width of the receptacles 84. The greatest transverse width of the discharge chamber 89 and of the receptacles 84 is measured perpendicular to the direction of the movement of the conveyor through the discharge device 18. Further, the linear dimension of the discharging chamber 89, that is, the dimension running in the direction of travel of the conveyor, is greater than the linear dimension of each receptacle 84.

The cover plate 68 is provided with a central opening 98 for a conduit 100. The conduit 100 is adapted to conduct a supply of the compressed air from any conventional source and is provided with a pressure gauge 102 and a suitable valve (not shown). The supply of air pressure may be directed into the upper cavity 86, where it forces the material from the receptacles 84 down through the lower cavity 88 and into a spout 104. The conduit 28 is flexible and leads from the opening of the spout 104 to a conventional nozzle for applying the cement at its point of use. The nozzle itself does not form a part of this invention, and there are a number of types in use. They are constructed for picking up water by the flow of air and cement therethrough and mixing it in the nozzle, whereby the cement is applied to a wall or other surface, as in a plastering operation. When the device is used for sand blasting, a nozzle adaptable for that use is employed.

The upper plate 52, lower plate 54, and side strips 56, may be adjusted toward and away from the conveyor 20 for sealing the links 74 within the opening through the discharging device 18, by bringing them into tight engagement therewith. The cover plate 68 is provided with adjusting screws 106 threaded through yoke 70, and bears on the cover plate 68, forcing the latter downwardly into tight engagement with the top plate 52, and pressing the links of the conveyor 20 downwardly. The side plates 58 have a lesser vertical extent than the top plate 52, lower plate 54 and side strips 56 together, leaving a gap 108 to allow for the adjustment just referred to. Similarly the side strips 56 can be brought inwardly toward the conveyor 20 by means of screws 110 threaded through the side plates 58 and engaging metal strips 112 which cover the outer surface of the side strips 56. The side strips 56 seal the links of the conveyor 20 against possible leakage through the points of connection between the individual links.

The effective operation of the discharging device is obtained by the manner in which the receptacles 84 are exposed in the discharging chamber 89 and by the compressed air conducted therethrough. By reference to comparison between Figs. 7 and 8, it will be seen how receptacles 84 enter into the discharging chamber 89 in overlapping relation to each other. Several individual receptacles of the chain 20 are given separate reference numerals to better illustrate this relationship. As receptacle 114 approaches the narrow end 90 of the discharging chamber 89, the preceding receptacle 116 has entered the discharging chamber to a considerable extent, and the receptacle 118 preceding the receptacle 116 has been completely emptied of its material. In the position shown in Fig. 8, the receptacle 116 has discharged most of its material, and the rate of discharging the remainder is reduced considerably, there being only the concealed area 120 extending outside of edge 96 that is yet to be discharged. After the receptacle 116 has passed to the left of the point shown, the receptacle 114 enters the discharging chamber 89 and the initial rate of discharge of the material from that receptacle is slow, and the farther into the discharging chamber it goes, the greater will be its rate of discharge of material. At the same time the discharge of material from the receptacle 116 will be decreased, resulting in substantially uniform discharge of material from the conveyor into the lower cavity 88. In the positions of the various receptacles as shown in Fig. 7, receptacle 116 has almost completely discharged its material, and the receptacle 114 has entered into the cavity to quite an extent, such that the rate of discharge of the material from the latter receptacle has reached a considerable proportion and increases and continues to increase up to a point in the region of the position of the receptacle 116 as shown in Fig. 8. This procedure continues from one receptacle to the next, each in overlapping relation with the preceding one, resulting in a substantially even and uniform discharge of material in the aggregate. It will be understood that the position of the receptacle 116 as shown in Fig. 8 may not be the exact point where the rate of flow of material therefrom begins to decrease, and I do not wish to be committed to such precision. Nevertheless, it is in that region that the rate of discharge begin to decrease, and about the same time the receptacle 114 begins to enter the discharging chamber. While the rate of discharge may not be 100 per cent uniform, still it is approximately uniform, and there is no complete starting and stopping such as would produce pulsating flow.

It will be noted that the distance between the edge 90 of the discharging chamber 89, and the right-hand end of the discharging device 18 as shown in Fig. 7, is greater than the linear dimension of a single receptacle 84, or the interior linear dimension of each link. A similar situation is also true with respect to the opposite end of the discharging device 18, that is, the distance between the edge 94 of the discharging chamber 89 and the left-hand end of the discharging device is greater than the linear dimension of each receptacle 84. Therefore, it will be seen that the cavities 86 and 88 are always sealed against the atmosphere, and full force of the compressed air passing therethrough is exerted on the cement.

Figs. 9 and 10 are views of the sprocket 27 which is specially designed for the conveyor 20 of the machine. The body of the sprocket is conventional in design having usual means for securing it to a shaft, and the teeth 122 are of great thickness and have curved surfaces 124 for engaging the links of the conveyor 20. Also they are curved transversely as shown at 126, for facilitating in engaging the links.

The modified form of apparatus shown in Fig. 11 embodies the same essential parts, but differs from the previous modification in that the upper run of the conveyor 20 of the present form is utilized for carrying the cement. Accordingly with the hopper 16 and the discharging device 18 in the same relative positions, the upper run of the conveyor must move from right to left, the conveyor sprockets 27 rotating counterclockwise. In this latter modification, it is unnecessary to have a channel similar to channel 44 through the interior of the hopper 16, since the return run of the conveyor is beneath the hopper, which simplifies the construction of the hopper. In other respects the device is the same or similar to the device shown in the first modification.

Although I have herein shown and described a preferred embodiment of my invention, manifestly it is capable of modification and rearrangement of parts without departing from the spirit and scope thereof. I do not, therefore, wish to be understood as limiting this invention to the precise form herein disclosed, except as I may be so limited by the appended claims.

I claim as my invention:

1. A discharge block for use with a continuous conveyor, which conveyor comprises a plurality of similar members, said members each having a single passage therethrough adapted to hold therein the material to be discharged, said discharge block having a conveyor passageway therein through which said conveyor passes, a pressurized fluid passageway through said discharge block, said passageways in said block intersecting each other, one branch of the intersected fluid passageway being an inlet, the other branch being an outlet, one end of each passage adapted to register with said inlet and the other end of said passage simultaneously registering with the outlet as the conveyor passes through said block, whereby pressurized fluid, when applied to said inlet, passes through the registering passages in said material holding members, entrains the material therein, and passes through said outlet; the improvement in said discharge block wherein the leading edges of said inlet and outlet lie transverse to the leading and trailing edges of the ends of the passages so that the portions of the block adjacent and forward said leading edges of the inlet and outlet cover a portion of the ends of one passage which is partially registering with the inlet and outlet when a portion of the ends of the following passage has passed said leading edges of the inlet and outlet into partial register therewith, said covered portions of said one passage thereafter passing into register with said inlet and outlet, whereby a continuous flow of material is maintained at all times.

2. A discharge block for use with a continuous conveyor, which conveyor comprises a plurality of similar material holding members, said members each having a single passage therethrough adapted to hold therein the material to be discharged; said discharge block having a conveyor passageway therein through which said conveyor passes, a pressurized fluid passageway through said discharge block, said passageways in said block intersecting each other, one branch on the intersected fluid passageway being an inlet, the other branch being an outlet, one end of each of said material holding passages adapted to register with said inlet and the other end of each of said passages simultaneously registering with the outlet as the conveyor passes through said block, whereby pressurized fluid, when applied to said inlet, passes through the registering passages in said material holding members, entrains the material therein, and passes through said outlet; the greatest projected width of said inlet and outlet being greater than the projected width of the ends of said passages and the leading edges of said inlet and outlet lying transverse to the leading and trailing edges of the ends of the passages so that the portions of the block adjacent and forward of the leading edges of said inlet and outlet cover a portion of the ends of one passage which is partially registering with the inlet and outlet when a portion of the ends of the following passage has passed said leading edges of the inlet and outlet and moved into partial register therewith, said covered portions of said one passage thereafter passing into register with said inlet and outlet, whereby a continuous flow of material is maintained at all times.

3. A discharge block for use with a continuous conveyor, which conveyor comprises a plurality of similar material holding members, said members each having a vertical passage therethrough adapted to hold therein the material to be discharged; said discharge block having a conveyor passageway therein through which said conveyor passes, a pressurized fluid passageway through said discharge block, said passageways in said block intersecting each other, one branch of the intersected fluid passageway being an inlet, the other branch being an outlet, the top end of each said passage adapted to register with said inlet and the lower end of each said passage simultaneously registering with the outlet as the conveyor passes through said block, the leading edges of the inlet and outlet lying transverse to the leading and trailing edges of said passage ends so that portions of the discharge block cover portions of the ends of one registering passage when a portion of the ends of the next passage first begin registering, said covered portions of said one passage thereafter passing into register with said inlet and outlet whereby a continuous flow of material is maintained at all times, said covered end portions of a registering passage, when the following passage first begins to register with said inlet and outlet, having a length measured from the leading edge of the outlet to that portion of the trailing edge of the passage end which is last to pass said leading edge of the outlet, and the ratio of the height of a vertical passage to said length of the covered portion of the passage end being no greater than the tangent of the angle of repose of the material within the passage, whereby a portion of the material is retained in the registering passage, until the ends of the next chamber first begin to register with said fluid passageway.

4. A discharge block as set forth in claim 2 wherein portions of said discharge block which bound said conveyor passageway are resilient, and means for compressing adjacent resilient portions against each other whereby sealing is effected.

ADOLPH F. LUKES.

REFERENCES CITED

The following references are of record in the file of this patent:

UNITED STATES PATENTS

| Number | Name | Date |
|---|---|---|
| 674,641 | Whittemore | May 21, 1901 |
| 743,957 | Tompkins et al. | Nov. 10, 1903 |
| 1,048,019 | Wilson | Dec. 24, 1912 |
| 1,712,248 | Brayton | May 7, 1929 |
| 2,156,878 | Sinden | May 2, 1939 |
| 2,262,094 | Burt | Nov. 11, 1941 |
| 2,299,565 | Colburn | Oct. 20, 1942 |
| 2,314,031 | Colburn | Mar. 16, 1943 |